United States Patent [19]

Takahashi et al.

[11] Patent Number: 5,278,215
[45] Date of Patent: Jan. 11, 1994

[54] FLAME-RETARDANT SYNTHETIC RESIN COMPOSITION AND FLAME RETARDANT

[75] Inventors: Katsuji Takahashi; Yuji Satoh, both of Chiba, Japan

[73] Assignee: Dainippon Ink and Chemicals, Inc., Tokyo, Japan

[21] Appl. No.: 858,845

[22] Filed: Mar. 27, 1992

[30] Foreign Application Priority Data

Mar. 29, 1991 [JP] Japan .................... 3-67173
Nov. 13, 1991 [JP] Japan .................... 3-297207

[51] Int. Cl.$^5$ .................... C07C 43/23; C08K 5/06
[52] U.S. Cl. .................... 524/373; 523/456; 523/510; 524/374; 528/89; 528/102; 568/641; 568/645
[58] Field of Search ........... 524/380, 373, 374, 375, 524/288, 410, 411, 412; 523/456, 510; 568/641, 645; 525/396, 403, 527, 115, 407; 528/89, 191, 202, 102, 297

[56] References Cited

U.S. PATENT DOCUMENTS

| | | | |
|---|---|---|---|
| 2,571,217 | 10/1951 | Davis et al. | 568/641 |
| 2,712,000 | 6/1955 | Zech | 528/89 |
| 3,016,362 | 1/1962 | Wismer | 525/527 |
| 3,074,974 | 1/1963 | Gebura | 568/641 |
| 3,162,615 | 12/1964 | Bremmer | 568/641 |
| 4,221,893 | 9/1980 | Behar et al. | 528/102 |
| 4,352,918 | 10/1982 | Whiteside | 528/89 |
| 4,530,880 | 7/1985 | Taniuchi et al. | 524/467 |
| 4,552,912 | 11/1985 | Williams | 524/467 |
| 4,952,647 | 8/1990 | Shirtum et al. | 525/523 |
| 5,043,375 | 8/1991 | Henning et al. | 524/373 |

FOREIGN PATENT DOCUMENTS 58-118849 7/1983 Japan .
59-53524 3/1984 Japan .

OTHER PUBLICATIONS

R. C. Nametz: Self Extinguishing Polyester Resins-Industrial & Engineering Chemistry; vol. 59, No. 5, May 1967, 99, 103, 104.

Primary Examiner—Veronica P. Hoke
Attorney, Agent, or Firm—Armstrong, Westerman, Hattori, McLeland & Naughton

[57] ABSTRACT

A flame-retardant synthetic resin composition containing (A) a synthetic resin and (B) a compound having a 3-halogeno-2-hydroxypropyl group, which shows excellent thermal stability during molding and having good light resistance, is disclosed. A flame retardant comprising a compound having a 3-halogeno-2-hydroxypropyl group is also disclosed.

12 Claims, No Drawings

FLAME-RETARDANT SYNTHETIC RESIN COMPOSITION AND FLAME RETARDANT

FIELD OF THE INVENTION

The present invention relates to an improvement in the flame retardancy of synthetic resins. More particularly, this invention relates to a flame-retardant synthetic resin composition showing excellent thermal stability during molding and having good light resistance, and also relates to a flame retardant.

BACKGROUND OF THE INVENTION

There have conventionally been known techniques for imparting flame retardancy to synthetic resins such as styrene resins and polyester resins. For example, JP-A-50-27843 (The term "JP-A" as used herein means an "unexamined published Japanese patent application".) discloses an expedient of incorporating a halogenated bisphenol A epoxy resin, as a flame retardant, having low volatility and excellent non-bleeding properties, heat resistance, and other properties and, according to need, further incorporating antimony trioxide or the like as a flame retardant aid. JP-A-62-4737 discloses an expedient of modifying an epoxy resin for use as a flame retardant by blocking the epoxy groups in the epoxy resin with a halogenated phenol such as tribromophenol.

However, the incorporation of a halogenated bisphenol A epoxy resin as disclosed in JP-A-50-27843 has had a problem that the thermal stability of the synthetic resin whose flame retardancy should be improved is significantly impaired by the epoxy resin. Illustratively stated, when the epoxy resin-incorporated synthetic resin composition is kneaded in an extruder and molded with an injection molding machine, epoxy groups in the epoxy resin undergo a polymerization reaction according to the heat hysteresis applied to the molten resin composition and, as a result, the epoxy resin gels, causing the composition to show poor flowability during molding, suffer discoloration, and come to contain aggregates resulting from gelation.

On the other hand, the flame retardant disclosed in JP-A-62-4737 has had a defect that although the proposed epoxy resin has eliminated the gelation problem, it impairs the light resistance of synthetic resins more than unmodified halogenated bisphenol A epoxy resins in which the epoxy groups are unblocked.

Since light resistance is an important requirement particularly for styrene resins in view of their actual uses, there has been an intense desire to solve the problem that flame-retardant synthetic resins excellent in both thermal stability and light resistance have been unable to be obtained.

SUMMARY OF THE INVENTION

The present inventors have conducted intensive studies in order to overcome the above problem and, as a result, the present invention has been completed.

Accordingly, an object of the present invention is to provide a flame-retardant synthetic resin composition which shows excellent thermal stability during molding and has good light resistance.

Another object of the present invention is to provide a flame retardant which imparts excellent thermal stability and good light resistance to synthetic resin compositions without suffering gelation.

Other objects and effects of the present invention will be apparent from the following description.

The present invention provides, in one aspect thereof, a flame-retardant synthetic resin composition containing (A) a synthetic resin and (B) a compound having a 3-halogeno-2-hydroxypropyl group.

The present invention further provides, in another aspect thereof, a flame retardant comprising a compound having a 3-halogeno-2-hydroxypropyl group.

DETAILED DESCRIPTION OF THE INVENTION

Compound (B) incorporated in the composition of the present invention is not particularly limited as long as it contains a 3-halogeno-2-hydroxypropyl group in the molecular structure thereof. It is, however, preferable that the molecular structure of the compound have two or more 3-halogeno-2-hydroxypropyl groups, in order to further enhance the effect of improving flame retardancy.

It is also preferred that, besides the halogen atom contained in the 3-halogeno-2-hydroxypropyl group, compound (B) further contain a halogen atom in the molecular structure thereof. Specifically, compound (B) preferably has a halogen content of from 40 to 60% by weight, with the more preferred halogen content range being from 50 to 55% by weight, which brings about significantly improved flame retardancy.

Examples of such compound (B) include: (b1) a compound obtained by the addition reaction of a hydrogen halide with epoxy groups of a halogenated epoxy resin; (b2) a compound obtained by the addition reaction of an epihalohydrin with a halogenated bisphenol; (b3) a compound obtained by reacting an epihalohydrin, a halogenated bisphenol, and a halogenated epoxy resin; and the like. Preferred of these are compound (b2) obtained by the addition reaction of an epihalohydrin with a halogenated bisphenol and compound (b3) obtained by reacting an epihalohydrin, a halogenated bisphenol, and a halogenated epoxy resin, because they can be produced through fewer steps at a significantly heightened efficiency.

The halogenated epoxy resin used for synthesizing compounds (b1) and (b3) is not particularly limited. Examples thereof include halogenated bisphenol epoxy resins, halogenated phenolic-novolac epoxy resins, halogenated cresol-novolac epoxy resins, halogenated resorcinol epoxy resins, halogenated hydroquinone epoxy resins, halogenated bisphenol A-novolac epoxy resins, halogenated methylresorcinol epoxy resins, halogenated resorcinol-novolac epoxy resins, and the like. Usually, however, a halogenated bisphenol epoxy resin having an average degree of polymerization of from about 0 to 50 is used.

The halogenated bisphenol used for synthesizing compounds (b2) and (b3) and halogenated bisphenols that can be used for producing the above-mentioned halogenated bisphenol epoxy resins are not particularly limited. Examples thereof include dibromobisphenol A, tetrabromobisphenol A, dichlorobisphenol A, tetrachlorobisphenol A, dibromobisphenol F, tetrabromobisphenol F, dichlorobisphenol F, tetrachlorobisphenol F, dibromobisphnol S, tetrabromobisphenol S, dichlorobisphenol S, tetrachlorobisphenol S, and the like.

Examples of the hydrogen halide used for synthesizing compound (b1) include hydrogen fluoride, hydrogen chloride, hydrogen bromide, hydrogen iodide, and the like, with hydrogen chloride and hydrogen bromide being especially preferred.

Examples of the epihalohydrin used for synthesizing compounds (b2) and (b3) include epichlorohydrin, epibromohydrin, and the like, with epichlorohydrin being preferred from the standpoint of stability to thermal decomposition.

The compound having a 3-halogeno-2-hydroxypropyl group which is to be incorporated in the composition of the present invention may be produced by a variety of methods without any particular limitation. However, it is preferable that, as is apparent from the above-enumerated examples, preferred methods for producing the compound are: (1) a method in which a hydrogen halide is reacted with epoxy groups of a halogenated epoxy resin by means of addition reaction; (2) a method in which an epihalohydrin is reacted with a halogenated bisphenol by means of addition reaction; (3) a method in which an epihalohydrin, a halogenated bisphenol, and a halogenated epoxy resin are reacted; and similar methods.

Method (1) in which a hydrogen halide is addition-reacted with epoxy groups of a halogenated epoxy resin may, for example, be practiced in the following manner, where a halogenated bisphenol epoxy resin is used as the halogenated epoxy resin.

That is, a halogenated bisphenol epoxy resin having an epoxy group is first obtained by the condensation reaction of a halogenated bisphenol with epichlorohydrin or by the addition reaction of a halogenated bisphenol diglycidyl ether with a halogenated bisphenol. The epoxy group of this epoxy resin is then reacted with a hydrogen halide to block the epoxy group, thereby to yield the desired compound having a 3-halogeno-2-hydroxypropyl group. It is preferable that the reaction between the hydrogen halide and epoxy group be conducted in such a manner that the resulting reaction product has no epoxy group. However, if the reaction product obtained contains a hydrogen halide remaining unreacted, incorporation of this reaction product into a synthetic resin for improving thermal stability causes a problem that the resulting resin composition suffers burning or discoloration during molding and the molding machine rusts. In order to avoid this problem, it is preferable to use, in the above reaction, the halogenated epoxy resin and hydrogen halide in such a proportion that the number of halogen atoms in the hydrogen halide is in the range of from 1 to 0.5, particularly from 1 to 0.8, per one epoxy group in the halogenated epoxy resin.

For example, in the case where a halogenated bisphenol epoxy resin having an average degree of polymerization of 0 to 50 is used, the amount of a hydrogen halide to be used is generally from 0.4 to 9.4% by weight for hydrogen chloride and from 0.9 to 18.8% by weight for hydrogen bromide, based on the total amount of the halogenated epoxy resin and the hydrogen halide.

Method (2) above in which an epihalohydrin is addition-reacted with a halogenated bisphenol may, for example, be practiced by bringing the epihalohydrin into contact with the halogenated bisphenol in the presence of a catalyst. In this case, the halogenated bisphenol and the epihalohydrin generally are used in such a proportion that the number of glycidyl groups in the epihalohydrin is from 1.2 to 0.5 per one phenolic hydroxyl group in the halogenated bisphenol. From the standpoint of imparting excellent light resistance to the final flame-retardant synthetic resin composition, it is preferable to use the two reactants in such a proportion that the glycidyl group number is from 1 to 0.8 per one phenolic hydroxyl group.

Examples of the catalyst used in the above reaction include alkali metal hydroxides such as sodium hydroxide, tertiary amines such as dimethylbenzylamine, imidazole derivatives such as 2-ethyl-4-methylimidazole, quaternary ammonium salts such as tetramethylammonium chloride, phosphonium salts such as ethyltriphenylphosphonium iodide, phosphines such as triphenylphosphine, and the like. Of these, phosphonium salts such as ethyltriphenylphosphonium iodide, tetraphosphonium bromide, and the like are preferred because such catalysts show excellent catalytic activity in the above reaction and because the reaction product obtained using such a catalyst has excellent thermal stability.

In general, the amount of the catalyst used in the above reaction preferably is from 1 to 0.01% by weight based on the total amount of the halogenated bisphenol and epihalohydrin, because catalyst amounts in this range enable formation of a 3-halogeno-2-hydroxypropyl group without allowing the addition reaction to proceed to a stage where epoxy group is formed. The particularly preferred range of the catalyst amount is from 0.5 to 0.01% by weight from the standpoint of reaction time reduction.

Method (3) above in which an epihalohydrin, a halogenated bisphenol, and a halogenated epoxy resin are reacted may, for example, be practiced by first reacting the halogenated epoxy resin with an excess amount of the halogenated bisphenol to obtain an adduct having a terminal phenolic hydroxyl group, and then addition-reacting the epihalohydrin with the above-obtained adduct in the presence of a catalyst. In this case, the halogenated bisphenol and the halogenated epoxy resin generally are used in such a proportion that the number of epoxy groups in the halogenated epoxy resin is from 0.95 to 0.05 per one phenolic hydroxyl group in the halogenated bisphenol. From the standpoint of imparting extremely high heat resistance and impact resistance to the final flame-retardant synthetic resin composition, it is preferred to use the two reactants in such a proportion that the epoxy group number is from 0.7 to 0.1 per one phenolic hydroxyl group.

In the second step in the above method, the adduct, obtained by the reaction of a halogenated bisphenol with a halogenated epoxy resin and having a terminal phenolic hydroxyl group, and the epihalohydrin generally are used in such a proportion that the number of glycidyl groups in the epihalohydrin is from 1.2 to 0.5 per one terminal phenolic hydroxyl group in the adduct. From the standpoint of imparting excellent light resistance to the final flame-retardant synthetic resin composition, it is preferred that the glycidyl group number be from 1 to 0.8 per one terminal phenolic hydroxyl group, as in the case of method (2) above.

Examples of the catalyst for use in the second step in the above method, i.e., in the reaction between an epihalohydrin and the adduct obtained by the reaction of a halogenated bisphenol with a halogenated epoxy resin and having a terminal phenolic hydroxyl group, include the same catalysts as those enumerated hereinabove with reference to method (2).

In general, the amount of the catalyst used in the second step in the above method (3) is from 1 to 0.01% by weight based on the total amount of the halogenated bisphenol, halogenated epoxy resin, and epihalohydrin, because catalyst amounts in this range enable formation of a 3-halogeno-2-hydroxypropyl group without allowing the addition reaction to proceed to a stage where epoxy group is formed. The particularly preferred range of the catalyst amount is from 0.5 to 0.01% by weight from the standpoint of reaction time reduction.

Of the above-described methods (1) to (3), methods (2) and (3) are particularly preferred from the standpoint that the flame retardant can be produced through fewer steps.

Synthetic resin component (A) in the composition of the present invention may be either a thermosetting resin or a thermoplastic resin. Examples of the thermosetting resin include epoxy resins, phenolic resins, polyurethane resins, and the like. Examples of the thermoplastic resins include polyolefin resins such as polyethylene and polypropylene; styrene resins such as polystyrene, rubber-modified polystyrenes (HIPS resins), styrene-acrylonitrile copolymers (AS resins), acrylonitrile-styrene-butadiene copolymers (ABS resins), acrylonitrile-acrylic rubber-styrene copolymers (AAS resins), and acrylonitrile-(ethylene-propylene rubber)-styrene copolymers (AES resins); polyester resins such as poly(butylene terephthalate) (PBT resins) and poly(ethylene terephthalate) (PET resins); polyamide resins; polycarbonate resins; poly(phenylene oxide) resins (PPO resins); polymer alloys such as alloys of ABS resins and polycarbonates, alloys of ABS resins and PBT resins, and alloys of polystyrene and PPO resins; and the like. Of these, thermoplastic resins, particularly styrene resins and polymer alloys containing styrene resins are preferred.

The amount of the flame retardant, compound (B), incorporated in synthetic resin (A) is not particularly limited. It is, however, preferred that the flame retardant amount be from 5 to 40 parts by weight per 100 parts by weight of the synthetic resin.

If required and necessary, a flame retardant aid may be incorporated in the synthetic resin composition of the present invention to further heighten the flame retardancy thereof. Examples of the flame retardant aid include antimony compounds such as antimony trioxide, antimony tetroxide, and antimony pentoxide, tin compounds such as tin oxide and tin hydroxide, molybdenum compounds such as molybdenum oxide and ammonium molybdate, zirconium compounds such as zirconium oxide and zirconium hydroxide, boron compounds such as zinc borate and barium metaborate, and the like.

Blending of the above-described ingredients for obtaining the flame-retardant synthetic resin composition of the present invention may, for example, be attained by premixing the ingredients by means of a mixing machine such as, for example, a Henschel mixer, tumble mixer, or the like and then melt-kneading the mixture with an extruder, kneader, heated rolls, Banbury mixer, or the like. Along with the flame retardant according to the present invention, other known flame retardants may be used as long as light resistance and thermal stability during molding are not significantly impaired by the additionally incorporated flame retardants. If required and necessary, an ultraviolet absorber, light stabilizer, heat stabilizer, antioxidant, releasing agent, lubricant, colorant, plasticizer, filler, foaming agent, reinforcement such as glass fibers, carbon fibers, or aramid fibers, and other additives or ingredients may be further incorporated in the composition of the present invention.

As described above, since the thus-obtained flame-retardant synthetic resin composition of the present invention shows excellent thermal stability during molding, molded articles can be produced therefrom at an improved efficiency. Further, since the composition has good light resistance, it is also useful as a material for producing electrical or electronic machine parts, automotive parts, and other applications which are required to have flame retardancy.

The flame retardant of the present invention, when incorporated in synthetic resins, enables the resins to show excellent thermal stability during molding because the flame retardant does never gel during molding. The flame retardant also enables the synthetic resins to have excellent light resistance.

The present invention will be illustrated in more detail with reference to the following Examples and Comparative Examples, but the invention is not construed as being limited thereto.

In these examples, all parts and percents are by weight, and various examinations were made according to the following test methods.

(1) Softening point (ring-and-ball method):
Measured in accordance with JIS K-7234.

(2) Epoxy group content:
Epoxy equivalent (g/eq) was measured in accordance with JIS K-7236 and the reciprocal of the measured value was referred to as the epoxy group content (eq/g).

(3) Heat distortion temperature (load 18.6 kg/cm$^2$):
Measured in accordance with ASTM D-648.

(4) Izod impact strength (notched)
Measured on ¼ inch-thick test pieces in accordance with ASTM D-256.

(5) Light resistance:
Weathering test was conducted for 100 hours using a sunshine weatherometer (manufactured by Suga Testing Machines) and the test pieces were examined with a color-difference meter to determine the color change through weathering.

(6) Flammability (UL-94):
Measured on five test pieces, for each composition, having a length of 5 inches, width of ½ inch, and thickness of ⅛ inch in accordance with the method as specified in Underwriters Laboratories, Subject 94.

(7) Residence test in molding machine (thermal stability):
Each of resin compositions was molded in a 5-ounce injection molding machine, with the cylinder temperature being regulated at 230° C. for ABS resin-based compositions and HIPS resin-based compositions and at 270° C. for PBT resin-based compositions. After the 20-minute residence, each resin composition was molded into a disk (outer diameter 100 mm, thickness 3 mm). The disks were visually examined for discoloration and inclusion of contaminants, and evaluated according to the following criteria.

A: turned slightly yellow.

B: turned brown (slight inclusion of contaminant particles resulting from burning).

C: considerable discoloration with a large number of contaminant particles.

(8) Kneading torque test (thermal stability):
Each of pelleted samples in an amount of 60 g was kneaded using a Laboplastomill for kneading-torque measurement (manufactured by Toyo Seiki Seisaku- Sho, Ltd., Japan) at a mixer revolution of 50 rpm, with the kneading temperature being regulated at 250° C. for ABS resin-based samples and HIPS resin-based samples and at 280° C for PBT resin-based samples. The kneading torque for each sample was measured throughout the kneading to determine its change with the lapse of one hour, and the samples were evaluated according to the following criteria.

A: suffered no torque change.
B: increased in viscosity.
C: gelled.

EXAMPLE 1

Into a 2-liter flask equipped with a water-cooled condenser, thermometer, and stirrer were introduced 720.0 g of tetrabromobisphenol A diglycidyl ether (EPICLON 152, manufactured by Dainippon Ink & Chemicals, Inc.; epoxy equivalent 360 g/eq, bromine content 48%; hereinafter referred to as EPICLON 152) and 223.2 g of tetrabromobisphenol A (hereinafter abbreviated as TBA). After the atmosphere in the flask was replaced with nitrogen gas, the contents were melted with heating and 0.3 g of a 10% aqueous solution of sodium hydroxide was added thereto at 100° C. This mixture was heated at a temperature of from 140° to 160° C. for 5 hours, thereby allowing a reaction to proceed.

The resulting reaction product had an epoxy group content of $1.23 \times 10^{-3}$ eq/g.

To the thus-obtained reaction product was gradually added 900.0 g of methyl isobutyl ketone (hereinafter abbreviated as MIBK). The temperature for this mixture was dropped to 80° C. to completely dissolve the reaction product. To this solution, 117.6 g of 36% hydrochloric acid was added dropwise from a dropping funnel over a period of 1 hour at a temperature of 60° to 80° C. (this hydrochloric acid amount was such that the number of chlorine atoms in the hydrochloric acid was 1 per one epoxy group in the reaction product). Thereafter, reaction was further allowed to proceed until the pH of the reaction mixture became a value between 6 and 7.

After the pH value had come into the specified range, the flask was fitted with a vacuum simple distillation apparatus. Subsequently, the reaction mixture was first heated to 120° C. at ordinary pressure to remove the water from the reaction mixture by evaporation, and then the mixture was heated to 160° C. and the flask was evacuated (to a maximum vacuum of 10 Torr) to remove the MIBK from the reaction mixture by evaporation. The pressure inside the flask was then elevated to ordinary pressure by introducing nitrogen gas. The thus-obtained reaction product was poured onto a stainless-steel pan cooled, and then pulverized, thereby obtaining a flame retardant as a pale-yellow powder. This product is referred to as flame retardant A. Properties thereof are shown in Table 1.

EXAMPLE 2

Into a 2-liter flask equipped with a water-cooled condenser, thermometer, and stirrer were introduced 720.0 g of EPICLON 152 and 506.0 g of TBA. After the atmosphere in the flask was replaced with nitrogen gas, the contents were melted with heating and 0.6 g of a 10% aqueous solution of sodium hydroxide was added thereto at 100° C. This mixture was heated at a temperature of from 150° to 230° C. for 10 hours, thereby allowing a reaction to proceed. The resulting reaction product had an epoxy group content of $0.10 \times 10^{-3}$ eq/g. To the thus-obtained reaction product was gradually added 1,200.0 g of dioxane. The temperature for this mixture was dropped to 80° C. to completely dissolve the reaction product. To this solution, 13.4 g of 36% hydrochloric acid was added dropwise from a dropping funnel at a temperature of 60° to 80° C. (this hydrochloric acid amount was such that the number of chlorine atoms in the hydrochloric acid was 1 per one epoxy group in the reaction product). Thereafter, reaction was further allowed to proceed until the pH of the reaction mixture became a value between 6 and 7. After the pH value had come into the specified range, the resulting reaction mixture was dropped into 3 liters of water placed in a 5-liter beaker, whereby a precipitate was formed. This precipitate was separated by filtration and washed repeatedly with boiling water. The thus-obtained reaction product was dried with hot air, cooled, and then pulverized, thereby obtaining a flame retardant as a light-brown powder. This product is referred to as flame retardant B. Properties thereof are shown in Table 1.

EXAMPLE 3

A flame retardant powder was obtained in the same manner as in Example 1 except that 720.0 g of EPICLON 152, 223.2 g of TBA, 0.3 g of 10% aqueous sodium hydroxide solution, and 212.0 g of 47% hydrobromic acid (one bromine atom per one epoxy group) were used. The thus-obtained flame retardant is referred to as flame retardant C. Properties thereof are shown in Table 1.

EXAMPLE 4

A flame retardant powder was obtained in the same manner as in Example 1 except that 720.0 g of EPICLON 152, 223.2 g of TBA, 0.3 g of 10% aqueous sodium hydroxide solution, and 70.6 g of 36% hydrochloric acid (0.5 chlorine atom per one epoxy group) were used. The thus-obtained flame retardant is referred to as flame retardant D. Properties thereof are shown in Table 1.

EXAMPLE 5

Into a 2-liter flask equipped with a thermometer and stirrer were introduced 432.0 g of EPICLON 152 and 1,088.0 g of TBA. After the atmosphere in the flask was replaced with nitrogen gas, the contents were melted with heating and 1.09 g of tetraphosphonium bromide was added thereto as a catalyst at 100° C. This mixture was heated at a temperature of from 140° to 160° C. for 5 hours, thereby allowing a reaction to proceed. Thereafter, 246.1 g of epichlorohydrin (hereinafter abbreviated as ECH) was added to the reaction mixture and the resulting mixture was then heated at 140° to 160° C. for 5 hours to allow a reaction to proceed. The resultant reaction product was poured onto a stainless-steel pan, cooled, and then pulverized, thereby obtaining a flame retardant as a pale-yellow powder. This product is referred to as flame retardant E. Properties thereof are shown in Table 1.

EXAMPLE 6

A flame retardant powder was obtained in the same manner as in Example 5 except that 576.9 g of EPICLON 152, 1,088.0 g of TBA, and 210.9 g of ECH were used. The thus-obtained flame retardant is referred to as flame retardant F. Properties thereof are shown in Table 1.

EXAMPLE 7

Into a 2-liter flask equipped with a thermometer and stirrer were introduced 1,088.0 g of TBA and 362.6 g of ECH. After the atmosphere in the flask was replaced with nitrogen gas, 1.09 g of tetraphenylphosphonium bromide was added as a catalyst and the resulting mixture was heated at a temperature of from 140° to 160° C. for 5 hours, thereby allowing a reaction to proceed. After completion of the reaction, the resulting reaction product was poured onto a stainless-steel pan, cooled, and then pulverized, thereby obtaining a flame retardant as a pale-yellow powder. This product is referred to as flame retardant G. Properties thereof are shown in Table 1.

COMPARATIVE EXAMPLE 1

Into a 1-liter separable flask equipped with a thermometer and stirrer were introduced 720.0 g of EPICLON 152 and 223.2 g of TBA. After the atmosphere in the flask was replaced with nitrogen gas, the contents were melted with heating and 0.3 g of 10% aqueous sodium hydroxide solution was added thereto at 100° C. This mixture was then heated at a temperature of from 140° to 160° C. for 5 hours, thereby allowing a reaction to proceed. After completion of the reaction, the resulting reaction product was poured onto a stainless-steel pan, cooled, and then pulverized, thereby obtaining a flame retardant as a pale-yellow powder. This product is referred to as flame retardant H. Properties thereof are shown in Table 1.

COMPARATIVE EXAMPLE 2

A flame retardant powder was obtained in the same manner as in Example 1 except that 720.0 g of EPICLON 152, 160 g of TBA, 450.0 g of 2,4,6-tribromophenol (hereinafter abbreviated as TBP), and 1.3 g of 10% aqueous sodium hydroxide solution were used and that reaction was conducted at 150° to 180° C. for 10 hours. This product is referred to as flame retardant I. Properties thereof are shown in Table 1.

TABLE 1-1

| | Ex. 1 | Ex. 2 | Ex. 3 | Ex. 4 |
|---|---|---|---|---|
| Flame retardant | A | B | C | D |
| Reactant amount (parts) | | | | |
| EPICLON 152 | 720.0 | 720.0 | 720.0 | 720.0 |
| TBA | 223.2 | 506.0 | 223.2 | 223.2 |
| 36% HCl aq. | 117.6 | 13.4 | — | 70.6 |
| 47% HBr aq. | — | — | 212.0 | — |
| Property | | | | |
| Average degree of polymerization | 1.6 | 30 | 1.6 | 1.6 |
| Epoxy group content ($\times 10^{-3}$ eq/g) | 0.01 | 0.01 or less | 0.01 | 0.45 |
| Softening point (°C.) | 116 | 204 | 116 | 115 |
| Bromine content (%) | 48 | 52 | 54 | 49.2 |
| Chlorine content (%) | 4 | 0.3 | — | 2.6 |

TABLE 1-2

| | Example 5 | Example 6 | Example 7 |
|---|---|---|---|
| Flame Retardant | E | F | G |
| Reactant amount (parts) | | | |
| EPICLON 152 | 432.0 | 576.9 | — |
| TBA | 1088.0 | 1088.0 | 1088.0 |
| ECH | 246.1 | 210,9 | 362.6 |
| Property | | | |
| Average degree of polymerization | 0.90 | 1.41 | 0.1 |
| Epoxy group content | 0.01 | 0.01 | 0.01 |

TABLE 1-2-continued

| | Example 5 | Example 6 | Example 7 |
|---|---|---|---|
| ($\times 10^{-3}$ eq/g) | or less | or less | or less |
| Softening point (°C.) | 100 | 115 | 65 |
| Bromine content (%) | 47.9 | 48.7 | 44.7 |
| Chlorine content (%) | 5.3 | 4.3 | 9.2 |

TABLE 1-3

| | Comparative Example 1 | Comparative Example 2 |
|---|---|---|
| Flame retardant | H | I |
| Reactant Amount (parts) | | |
| EPICLON 152 | 720.0 | 720.0 |
| TBA | 223.2 | 160.0 |
| TBP | — | 450.0 |
| 36% HCl aq. | — | — |
| Property | | |
| Average degree of polymerization | 1.6 | 1.0 |
| Epoxy group content ($\times 10^{-3}$ eq/g) | 1.23 | 0.05 |
| Softening point (°C.) | 116 | 116 |
| Bromine content (%) | 50 | 57 |
| Chlorine content (%) | — | — |

EXAMPLES 8 TO 21

Using flame retardants A to G, mixtures were prepared according to the formulations as shown in Table 2. Each mixture was premixed by means of a tumble mixer and then pelletized with a 30-mm$\phi$ twin-screw extruder. Thus, flame-retardant synthetic resin compositions were obtained. The pelleted compositions were then formed into test pieces using a 5-ounce injection molding machine.

The cylinder temperature in each of the above extruder and injection molding machine was regulated at 230° C. for the ABS resin-based compositions and HIPS resin-based compositions and at 270° C. for the PBT resin-based compositions.

The ABS resin used above was "CEVIAN V" manufactured by Daicel Chemical Industries, Ltd., Japan; the PBT resin was "VALOX" manufactured by Nippon GE Plastic Inc.; the HIPS resin was "GH-7000" manufactured by Dainippon Ink & Chemicals, Inc.; the antimony trioxide was "ATOX-F" manufactured by Nihon Mining & Concentrating Co., Ltd., Japan; and the glass fiber was "Chopped Strand" manufactured by Nitto Boseki Co., Ltd., Japan.

The test pieces obtained above were subjected to tests for determining heat distortion temperature, Izod impact strength, light resistance, and flammability. The results obtained are summarized in Table 3.

The pellets were further subjected to the residence test in molding machine and kneading torque test for determining thermal stability. The results obtained are also shown in Table 3.

COMPARATIVE EXAMPLES 3 TO 9

Using each of flame retardant H, flame retardant I, tetrabromobisphenol A "BP-59" (hereinafter abbreviated as TBA) manufactured by Great Lake Chemical Corp., and decabromodiphenyl ether "SAYTEX S-102" (hereinafter abbreviated as DBDPE) manufactured by Ethyl Corp., mixtures were prepared according to the formulations as shown in Table 2. Each mixture was premixed by means of a tumble mixer and then pelletized with a 30-mm$\phi$ twin-screw extruder. Thus, flame-retardant synthetic resin compositions were obtained. The pelleted compositions were then formed into test pieces using a 5-ounce injection molding machine.

The cylinder temperature in each of the above extruder and injection molding machine was regulated at 230° C. for the ABS resin-based compositions and HIPS resin-based compositions and at 270° C. for the PBT resin-based composition.

The test pieces obtained above were subjected to tests for determining heat distortion temperature, Izod impact strength, light resistance, and flammability. The results obtained are summarized in Table 3.

The pellets were further subjected to the residence test in molding machine and kneading torque test for determining thermal stability. The results obtained are also shown in Table 3.

TABLE 2-1

| | Examples | | | | | |
|---|---|---|---|---|---|---|
| Composition (parts) | 8 | 9 | 10 | 11 | 12 | 13 |
| ABS resin | 100 | 100 | 100 | 100 | 100 | 100 |
| Flame retardant | A | B | C | D | E | F |
| | 27 | 27 | 27 | 27 | 27 | 27 |
| Antimony trioxide | 7 | 7 | 7 | 7 | 7 | 7 |

TABLE 2-2

| | Ex. | Comp. Ex. | | | |
|---|---|---|---|---|---|
| Composition (parts) | 14 | 3 | 4 | 5 | 6 |
| ABS resin | 100 | 100 | 100 | 100 | 100 |
| Flame retardant | G | H | I | TBA | DBDPE |
| | 27 | 27 | 27 | 25 | 17 |
| Antimony trioxide | 7 | 7 | 7 | 7 | 7 |

TABLE 2-3

| | Examples | | | | | |
|---|---|---|---|---|---|---|
| Composition (parts) | 15 | 16 | 17 | 18 | 19 | 20 |
| HIPS resin | 100 | 100 | 100 | 100 | 100 | 100 |
| Flame retardant | A | B | D | E | F | G |
| | 25 | 25 | 25 | 25 | 25 | 25 |
| Antimony trioxide | 5 | 5 | 5 | 5 | 5 | 5 |

TABLE 2-4

| | Comp. Ex. | | Ex. | Comp. Ex. |
|---|---|---|---|---|
| Composition (parts) | 7 | 8 | 21 | 9 |
| HIPS resin | 100 | 100 | — | — |
| PBT resin | — | — | 100 | 100 |
| Flame retardant | H | I | B | I |
| | 25 | 25 | 22 | 22 |
| Antimony oxide | 5 | 5 | 7 | 7 |
| Glass fiber | — | — | 54 | 54 |

TABLE 3-1

| | Examples | | | |
|---|---|---|---|---|
| | 8 | 9 | 10 | 11 |
| Property | | | | |
| Heat distortion temp. (°C.) | 82 | 87 | 82 | 82 |
| Izod impact strength (kg · cm/cm) | 13 | 7 | 13 | 13 |
| Light resistance (ΔE) | 11.2 | 12.6 | 12.4 | 11.3 |
| Flammability (UL-94) | V-0 | V-0 | V-0 | V-0 |
| Thermal stability | | | | |
| Resistance test in molding machine | A | A | A | A |
| Kneading torque test | A | A | A | A |

TABLE 3-2

| | Examples | | |
|---|---|---|---|
| | 12 | 13 | 14 |
| Property | | | |
| Heat distortion temp. (°C.) | 81 | 82 | 78 |
| Izod impact strength (kg · cm/cm) | 15 | 13 | 18 |
| Light resistance (ΔE) | 11.6 | 11.8 | 11.2 |
| Flammability (UL-94) | V-0 | V-0 | V-0 |
| Thermal stability | | | |
| Resistance test in molding machine | A | A | A |
| Kneading torque test | A | A | A |

TABLE 3-3

| | Comparative Examples | | | |
|---|---|---|---|---|
| | 3 | 4 | 5 | 6 |
| Property | | | | |
| Heat distortion temp. (°C.) | 82 | 82 | 75 | 85 |
| Izod impact strength (kg · cm/cm) | 13 | 20 | 17 | 14 |
| Light resistance (ΔE) | 11.4 | 17.6 | 23.1 | 29.4 |
| Flammability (UL-94) | V-0 | V-0 | V-0 | V-0 |
| Thermal stability | | | | |
| Resistance test in molding machine | C | B | C | C |
| Kneading torque test | C | A | A | A |

TABLE 3-4

| | Examples | | |
|---|---|---|---|
| | 15 | 16 | 17 |
| Property | | | |
| Heat distortion temp. (°C.) | 82 | 87 | 82 |
| Izod impact strength (kg · cm/cm) | 5 | 3 | 5 |
| Light resistance (ΔE) | 12.5 | 13.7 | 12.6 |
| Flammability (UL-94) | V-0 | V-0 | V-0 |
| Thermal stability | | | |
| Resistance test in molding machine | A | A | A |
| Kneading torque test | A | A | A |

TABLE 3-5

| | Examples | | |
|---|---|---|---|
| | 18 | 19 | 20 |
| Property | | | |
| Heat distortion temp. (°C.) | 82 | 82 | 78 |
| Izod impact strength (kg · cm/cm) | 5 | 5 | 7 |
| Light resistance (ΔE) | 12.9 | 13.0 | 12.5 |
| Flammability (UL-94) | V-0 | V-0 | V-0 |
| Thermal stability | | | |
| Resistance test in molding machine | A | A | A |
| Kneading torque test | A | A | A |

TABLE 3-6

| | Comp. Ex. | | Ex. | Comp. Ex. |
|---|---|---|---|---|
| | 7 | 8 | 21 | 9 |
| Property | | | | |
| Heat distortion temp. (°C.) | 82 | 87 | 210 | 208 |
| Izod impact strength (kg · cm/cm) | 5 | 3 | 8 | 8 |
| Light resistance (ΔE) | 12.5 | 13.8 | 7.8 | 8.2 |
| Flammability (UL-94) | V-0 | V-0 | V-0 | V-0 |
| Thermal stability | | | | |
| Resistance test in molding machine | C | B | A | B |

TABLE 3-6-continued

|  | Comp. Ex. 7 | Ex. 8 | Ex. 21 | Comp. Ex. 9 |
|---|---|---|---|---|
| Kneading torque test | C | B | A | B |

While the invention has been described in detail and with reference to specific embodiments thereof, it will be apparent to one skilled in the art that various changes and modifications can be made therein without departing from the spirit and scope thereof.

What is claimed is:

1. A flame-retardant synthetic resin composition containing (A) a synthetic resin and (B) a flame-retardant amount of a compound having a 3-halogeno-2-hydroxypropyl group, said compound (B) being either (b2) a compound obtained by the addition reaction of an epihalohydrin with a halogenated bisphenol or (b3) a compound obtained by reacting an epihalohydrin, a halogenated bisphenol, and a halogenated epoxy resin.

2. A flame-retardant synthetic resin composition as claimed in claim 1, wherein synthetic resin (A) is a thermoplastic resin.

3. A flame-retardant synthetic resin composition as claimed in claim 1, wherein synthetic resin (A) is a styrene resin.

4. A flame-retardant synthetic resin composition as claimed in claim 1, wherein compound (b2) is a compound obtained by reacting an epihalohydrin with a halogenated bisphenol in such a proportion that the number of glycidyl groups in the epihalohydrin is from 1.2 to 0.5 per one phenolic hydroxyl group in the halogenated bisphenol.

5. A flame-retardant synthetic resin composition as claimed in claim 1, wherein compound (b3) is a compound obtained by reacting a halogenated bisphenol with a halogenated epoxy resin in such a proportion that the number of epoxy groups in the halogenated epoxy resin is from 0.95 to 0.05 per one phenolic hydroxyl group in the halogenated bisphenol, and then reacting the resulting reaction product with an epihalohydrin in such a proportion that the number of glycidyl groups in the epihalohydrin is from 1.2 to 0.5 per one terminal phenolic hydroxyl group in the reaction product.

6. A flame-retardant synthetic resin composition as claimed in claim 4, wherein said epihalohydrin is epichlorohydrin or epibromohydrin.

7. A flame-retardant synthetic resin composition as claimed in claim 5, wherein said epihalohydrin is epichlorohydrin or epibromohydrin.

8. A method for producing a flame retardant containing a 3-halogeno-2-hydroxypropyl group, comprising the step of reacting a halogenated bisphenol or a reaction product of a halogenated bisphenol and a halogenated epoxy resin with an epihalohydrin in the presence of a phosphonium salt.

9. The method as claimed in claim 8, wherein the reaction of halogenated bisphenol with epihalohydrin is carried out in such a proportion that the number of glycidyl groups in the epihalohydrin is from 1.2 to 0.5 per one phenolic hydroxyl group in the halogenated bisphenol.

10. The method as claimed in claim 8, wherein the reaction of halogenated bisphenol with halogenated epoxy resin is carried out in such a proportion that the number of epoxy groups in the halogenated epoxy resin is from 0.95 to 0.05 per one phenolic hydroxyl group in the halogenated bisphenol and the reaction of the resulting reaction product with epihalohydrin is carried out in such a proportion that the number of glycidyl groups in the epihalohydrin is from 1.2 to 0.5 per one terminal phenolic hydroxyl group in the reaction product.

11. The method as claimed in claim 9, wherein said epihalohydrin is epichlorohydrin or epibromohydrin.

12. The method as claimed in claim 10, wherein said epihalohydrin is epichlorohydrin or epibromohydrin.

* * * * *